April 25, 1950   R. J. FINCH ET AL   2,505,106

VALVE OPERATING MECHANISM

Filed Jan. 30, 1946

INVENTORS
Raymond J. Finch
And Arthur F. Harrington,
Deceased, by Minnie M. Harrington, Administratrix By J. H. Church & H. E. Thibodeau

ATTORNEYS

Patented Apr. 25, 1950

2,505,106

UNITED STATES PATENT OFFICE 2,505,106

VALVE OPERATING MECHANISM

Raymond J. Finch, Schenectady, N. Y., and Arthur P. Harrington, deceased, late of Schenectady, N. Y., by Minnie M. Harrington, administratrix, Schenectady, N. Y.

Application January 30, 1946, Serial No. 644,328

1 Claim. (Cl. 74—491)

This invention relates to a valve-operating mechanism.

It is an object of this invention to produce a positive acting valve mechanism which is particularly adapted for use as a shut-off valve for the fuel system of an internal combustion engine.

It is a further object of this invention to produce a valve mechanism which will always remain either fully open or shut and which will not dwell in an intermediate position.

A further object is to produce such a valve mechanism without the use of springs, except within the valve body itself, and in which the elements are protected against accidental damage.

Another object of the invention is to produce a valve-operating structure of generally improved design which is easy to manufacture using readily available materials and with few critical dimensions and which embodies means for compensating for wear in the valve or for variations in the manufacturing operations.

Other objects will be apparent from reading the specification.

The preferred method of achieving the above objects is shown on the accompanying drawings in which.

Like numbers refer to the same parts throughout the drawings.

Figure 1:
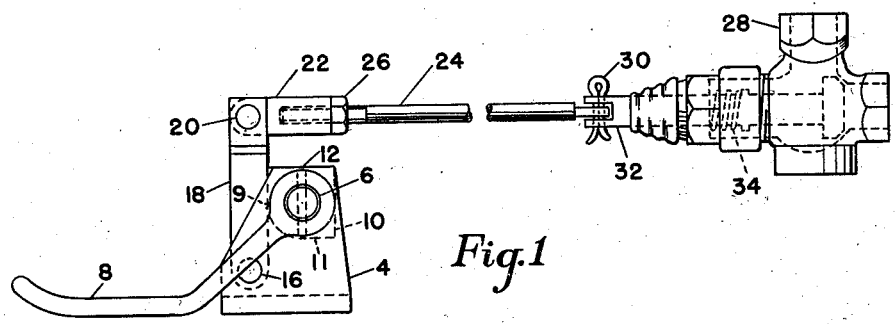
Figure 1 is a plan view of the valve-operating mechanism.
Figure 2:
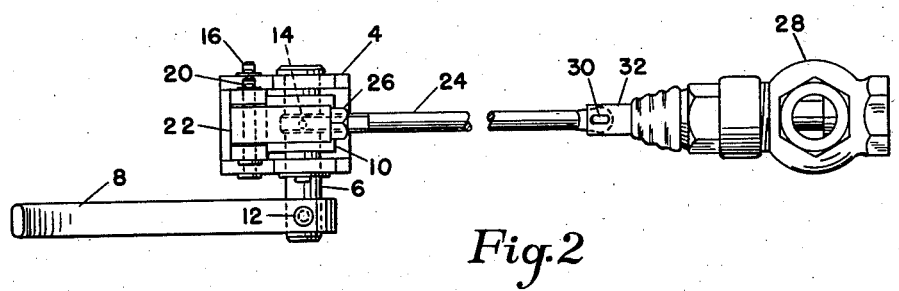
Figure 2 is an elevation view of the valve-operating mechanism.
Figure 3:
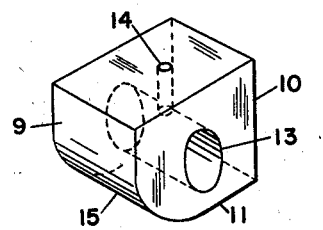
Figure 3 is an isometric view of the cam designated 10 in Figures 1 and 2.

Referring now to the specific structure illustrated by the drawings, the numeral 4 indicates the frame member of the valve-operating mechanism. Frame 4 is of generally U-shaped cross section. The frame 4 has holes bored through both of its side members forming two bearings for a shaft 6. One end of shaft 6 extends beyond frame 4 and is provided with an operating lever 8. Preferably the outer end of the operating lever is curved as illustrated so that the lever may be more readily moved when it is adjacent to a flat surface. Shaft 6 also is provided with a cam 10 which is located between and is almost as wide as the space between the side members of frame 4. Lever 8 and cam 10 are both fastened to shaft 6 so that all rotate together. This may be accomplished by welding or pinning the lever and cam to the shaft, or by means of keys 12 and 14 respectively.

The frame 4 is also bored to provide a bearing for a second shaft 16. Fitted between the side members on frame 4 is an arm 18. This arm rotates on the shaft 16, and may or may not be free to turn relative thereto. The upper portion of arm 18 is cut away in the middle to form a fork. The arms of the fork are bored to provide a bearing for shaft 20. Fitted over shaft 20 is a piece 22. One end of piece 22 is threaded so that the threaded valve actuating rod 24 may be screwed into it. Rod 24 may be provided with a nut 26 to lock the rod in place after it has been screwed in the desired distance.

The other end of rod 24 is connected with the valve 28 in any convenient manner. A preferred method of making the connection is illustrated and consists of inserting a cotter key 30 through a hole drilled in the rod and the yoke 32 of the valve. When the connection is made in this manner it is simple to make adjustments to compensate for variations in the length of the rod, wear of the valve seat and the like. The cotter key 30 may be removed and the rod turned until the desired adjustment is obtained. The valve 28 is of conventional design and will not be described in detail. The valve illustrated is of the pull-operated type and is normally held in a closed position by means of a spring 34. When the yoke 32 of the valve is pulled the the valve is opened.

The cam 10 has two primary or operating faces, 9 and 11, which are substantially 90° from each other. The cam is made so that the distances between face 9 and the opening 13 for shaft 6 differs from the distance between face 11 and opening 13. The two cam faces 9 and 11 are joined by a curved surface 15. The cam faces 9 and 11 are so arranged that they engage arm 18 and cause arm 18 to move, thus actuating the valve through rod 24.

In the mechanism illustrated, face 9 is further from opening 13 than face 11. Face 9 is disposed so that when it is in contact with arm 18, arm 18 is pushed outwardly, pulling the rod 24 so that valve 28 is open. When cam face 11 is in contact with arm 18, arm 18 is allowed to swing inwardly so that the valve is closed.

Since the two primary cam faces are flat it is apparent that when the cam is in one position that it will require some force to change the position of the valve. Thus, the valve will stay in one position and there is little danger that a jar or vibration will change its position. It is equally apparent that since the transition face is curved the valve will not stay in an intermediate position.

One typical application in which the present invention has proved very useful is in the fuel system of motor vehicles, particularly tanks. Here a shut-off valve is needed which is positive in its action and which is not apt to be dislodged when set in the desired position.

Many variations of the structure described are possible without departing from the spirit of this invention and we do not limit ourselves to the specific structure except as hereinafter claimed.

What we claim is:

A valve operating mechanism for a pull-operated valve comprising, in combination, a frame having two spaced side members, a shaft rotatably supported by said side members, a cam attached to said shaft between said side members and rotatable with said shaft, said cam having two flat operating faces substantially 90° from each other and joined by a curved transition face, said two flat faces being located at relatively different distances from said shaft, an arm pivotally mounted at one end thereof between said side members, said arm being positioned for contact intermediate the ends thereof by alternate ones of said two flat faces of said cam upon rotation of the latter, whereby said arm is subject to pivotal motion, an adjustable rod connected to said arm at the other end thereof and adapted to be connected to said valve for transmitting motion to the latter, and an operating lever attached to said shaft and rotatable therewith for rotating said cam.

RAYMOND J. FINCH.
MINNIE M. HARRINGTON,
*Administratrix of Estate of Arthur P. Harrington, Deceased.*

REFERENCES CITED

The following references are of record in the file of this patent:

UNITED STATES PATENTS

| Number | Name | Date |
|---|---|---|
| 564,562 | Holman | July 21, 1896 |
| 853,695 | Hill | May 14, 1907 |
| 888,196 | Regenbogen | May 19, 1908 |
| 941,703 | Fitts | Nov. 30, 1909 |
| 1,270,760 | Ibach | June 25, 1918 |
| 1,709,039 | Poirmeur | Apr. 16, 1929 |
| 1,807,842 | Harris | June 2, 1931 |
| 2,095,696 | Hackel | Oct. 12, 1937 |
| 2,285,810 | Eslinger | June 9, 1942 |

FOREIGN PATENTS

| Number | Country | Date |
|---|---|---|
| 470,050 | Germany | Jan. 3, 1929 |